United States Patent [19]
Merlo

[11] Patent Number: 5,588,767
[45] Date of Patent: Dec. 31, 1996

[54] LOCKING JOINT MECHANISM

[76] Inventor: Werner O. Merlo, 51203 Range Rd. 265, Spruce Grove, Alberta, Canada, T7Y 1E7

[21] Appl. No.: 495,104

[22] Filed: Jun. 27, 1995

Related U.S. Application Data

[63] Continuation-in-part of Ser. No. 435,363, May 5, 1995, abandoned.

[30] Foreign Application Priority Data

May 5, 1994 [GB] United Kingdom .................. 9408893

[51] Int. Cl.$^6$ ..................................................... F16C 11/06
[52] U.S. Cl. ........................... 403/128; 403/124; 403/103; 403/90; 403/84
[58] Field of Search ................................. 403/90, 83, 84, 403/92, 93, 97, 103, 124, 128, 122, 125; 135/21

[56] References Cited

U.S. PATENT DOCUMENTS

| | | | |
|---|---|---|---|
| 892,105 | 6/1908 | White | 403/90 X |
| 3,433,510 | 3/1969 | Holterstrom | 403/90 X |
| 3,691,788 | 9/1972 | Mazziotti | 403/90 X |
| 3,841,769 | 10/1974 | Boweman | 403/90 |
| 4,620,813 | 11/1986 | Lacher | 403/93 |
| 4,674,523 | 6/1987 | Glatz | 135/21 |
| 5,002,081 | 3/1991 | Stromeyer | 135/21 |
| 5,098,432 | 3/1992 | Wagenknecht | 403/90 X |
| 5,280,871 | 1/1994 | Chuang | 403/90 X |

FOREIGN PATENT DOCUMENTS

| 1606764 | 11/1990 | Russian Federation | 403/93 |
|---|---|---|---|
| 1455656 | 11/1974 | United Kingdom | 403/122 |

Primary Examiner—Anthony Knight
Attorney, Agent, or Firm—Terry M. Gernstein

[57] ABSTRACT

In an angularly adjustable, releasably lockable ball joint, the ball has a surface covered with regular polygonal patterns of spaced-apart protrusions. The protrusions each define a concavity. An actuator tip is provided to penetrate the concavity and simultaneously contact all of the protuberances of the pattern to lock the ball and actuator together, thereby fixing the orientation of shanks attached to the ball and actuator.

12 Claims, 6 Drawing Sheets

LOCKING JOINT MECHANISM

CROSS-REFERENCE TO RELATED APPLICATION

This application is a continuation-in-part of my application for U.S. letters patent Ser. No. 08/435,363 filed May 5, 1995, now abandoned.

FIELD OF THE INVENTION

This invention relates to an angularly adjustable, releasably lockable joint mechanism such as a ball joint.

BACKGROUND OF THE INVENTION

The present invention was developed in connection with a sunshade umbrella such as one would use by a pool. The invention will be discussed in that context. However it is to be understood that the novel joint mechanism disclosed will find application outside that field, for example in the field of prosthetics.

Angularly adjustable, releasably lockable ball joints are commonly used as part of an umbrella assembly, to hold a suspended canopy locked at an angle to horizontal. Assemblies of this type are shown in U.S. Pat. Nos. 4,674,523, issued to Glatz, and No. 5,002,081, issued to Stromeyer. In general, these prior art ball joints involve:

- a ball attached to a shank forming part of the suspension stand;
- an actuator or screw spindle carrying the canopy;
- a housing engaging the ball and spindle so that they cannot separate, but which is operative to enable the spindle to be angularly adjusted when the actuator is disengaged; and
- a concave socket or pin at the end of the spindle, for frictionally engaging the ball to lock the spindle and ball together and fix the canopy at a desired angle.

However, in windy conditions the frictional engagement of ball and socket has been found to be insufficient to hold the umbrella canopy angularly cocked. The socket can slip on the ball surface due to the high torsional forces experienced.

The work underlying the present invention was originally undertaken to provide a more reliable "lock-up" between the ball and the actuator comprising the screw spindle and concave socket.

At this point, it is appropriate to consider relevant prior art outside the suspension umbrella field. It is known in the context of angularly adjustable, releasably lockable ball joint assemblies to modify one or both of the engaging lock-up surfaces to create a better interlock. For example:

- U.S. Pat. Nos. 3,841,769 (Bowerman) and 4,620,813 (Lacher) show a socket having protuberances and a ball having dimples or indentations which engage to fix the orientation of the arms attached thereto;
- U.S. Pat. No. 3,691,788 (Mazziotti) shows a ball having a grooved surface and an actuator having a spherical tip which locks up by engaging a groove;
- U.S. Pat. No. 5,280,871 (Ching-Pao et al) and U.S. Pat. No. 3,433,510 (Hulterstrum) show a dimpled ball and an actuator having a spherical tip; and
- U.S. Pat. No. 892,105 (White) shows a ball and socket whose surfaces are both knurled.

Applicant has tested a dimpled ball and spherical pin actuator, but has found the "lock-up" to be inadequate for use on suspension umbrellas.

The objective of the invention is therefore to modify a conventional joint mechanism such as a ball joint to provide a stronger locking action between the actuator and the spherical member.

SUMMARY OF THE INVENTION

The present invention therefore provides an improvement to an angularly adjustable, releasably lockable joint mechanism for rigidly joining first and second parts (typically a pair of shanks) at a selected orientation. The known joint mechanism comprises:

- a rounded member having a plurality of concavities on its surface and being secured to the first part;
- a disengageable actuator having a rounded tip operative to be advanced, to lock up with the rounded member by penetrating a concavity, or to be retracted, to disengage them, said actuator being connected with the second part; and
- means for holding the parts, rounded member and actuator together while permitting the parts to change relative orientation when the actuator tip is retracted.

In accordance with the improvement:

- the rounded member has a plurality of patterns of spaced-apart protuberances covering at least part of its surface, the protuberances of each pattern forming a concavity;
- the patterns and protuberances are consistent in shape, area and size and the patterns have regular polygonal configurations, preferably triangular or square; and
- the protuberances, actuator tip and pattern are dimensioned so that the tip may penetrate the concavity of the pattern and simultaneously contacts all of the protuberances of the pattern that it penetrates, but remains spaced from the surface of the rounded member at full penetration.

The invention has the following advantages:

- the locking capability is greater than one obtains with a dimpled ball;
- by arranging the patterns in accordance with a geometric design, the longitude and latitude of the concavity sites is predictable; and
- the use of the triangular pattern yields a large number of concavity sites in the case of a rounded member that is spherical and of given diameter. Compared to an equivalent pattern of dimples, twice as many concavity sites result simply through the formation of the protuberances.

In a preferred feature of the invention, the rounded tip of the actuator is formed with a centrally positioned indentation or dimple at its end. The indentation is configured and dimensioned to substantially match the peak of a protuberance. Thus, if the actuator tip contacts the peak of a protuberance, the two parts will lock up. By this means, the number of lock up sites is increased.

DESCRIPTION OF THE PREFERRED EMBODIMENT

The invention provides a "lock-up" assembly comprising a novel spherical member studded with patterned protuberances and working with a pin-type actuator having a rounded end. The specific nature of the actuator and the shanks oriented by the assembly are conventional and they will not be described in any detail.

Figure 1:
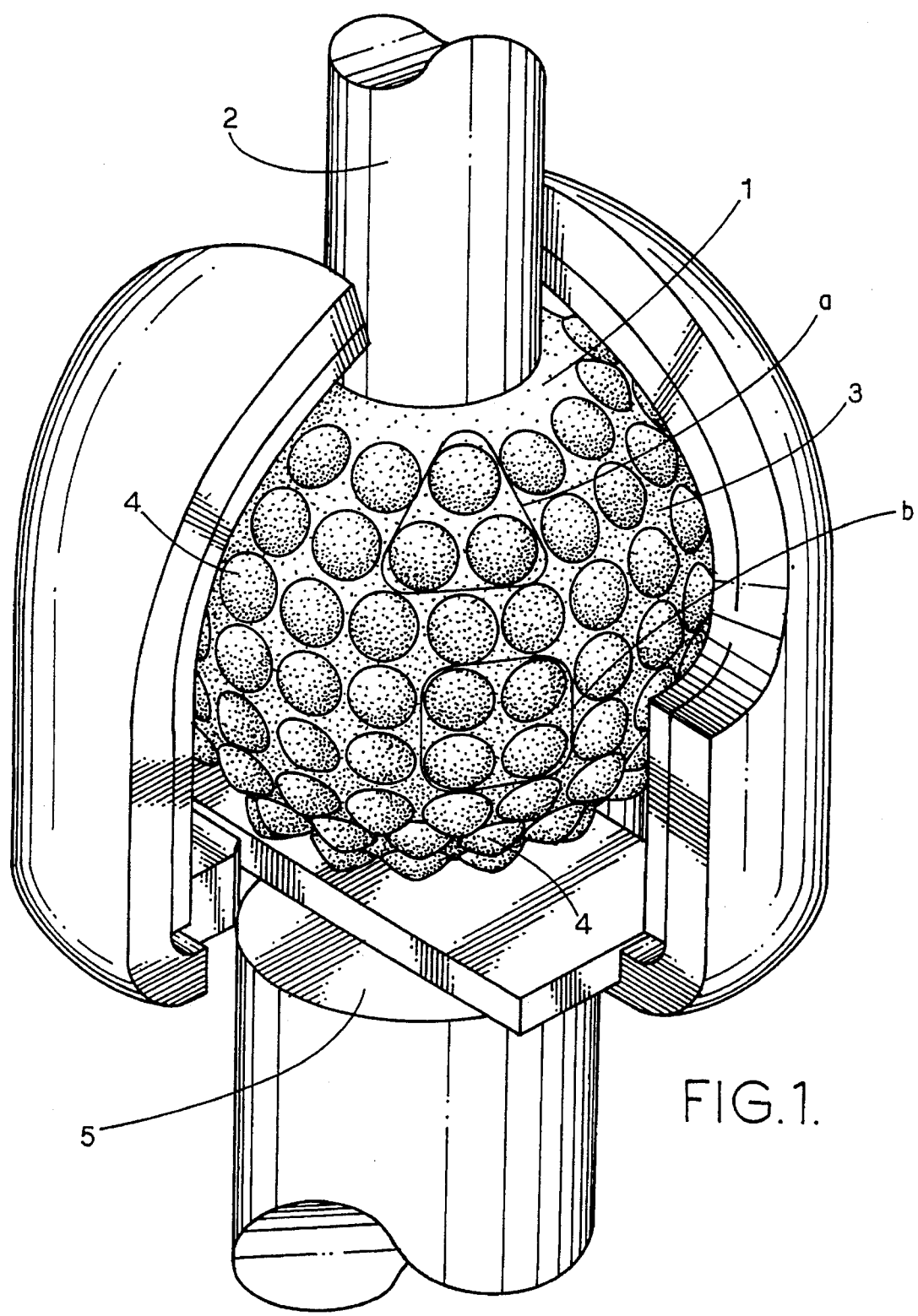
FIG. 1 is a perspective, partly sectional view showing the ball, actuator and connecting housing assembled.
Figure 2:
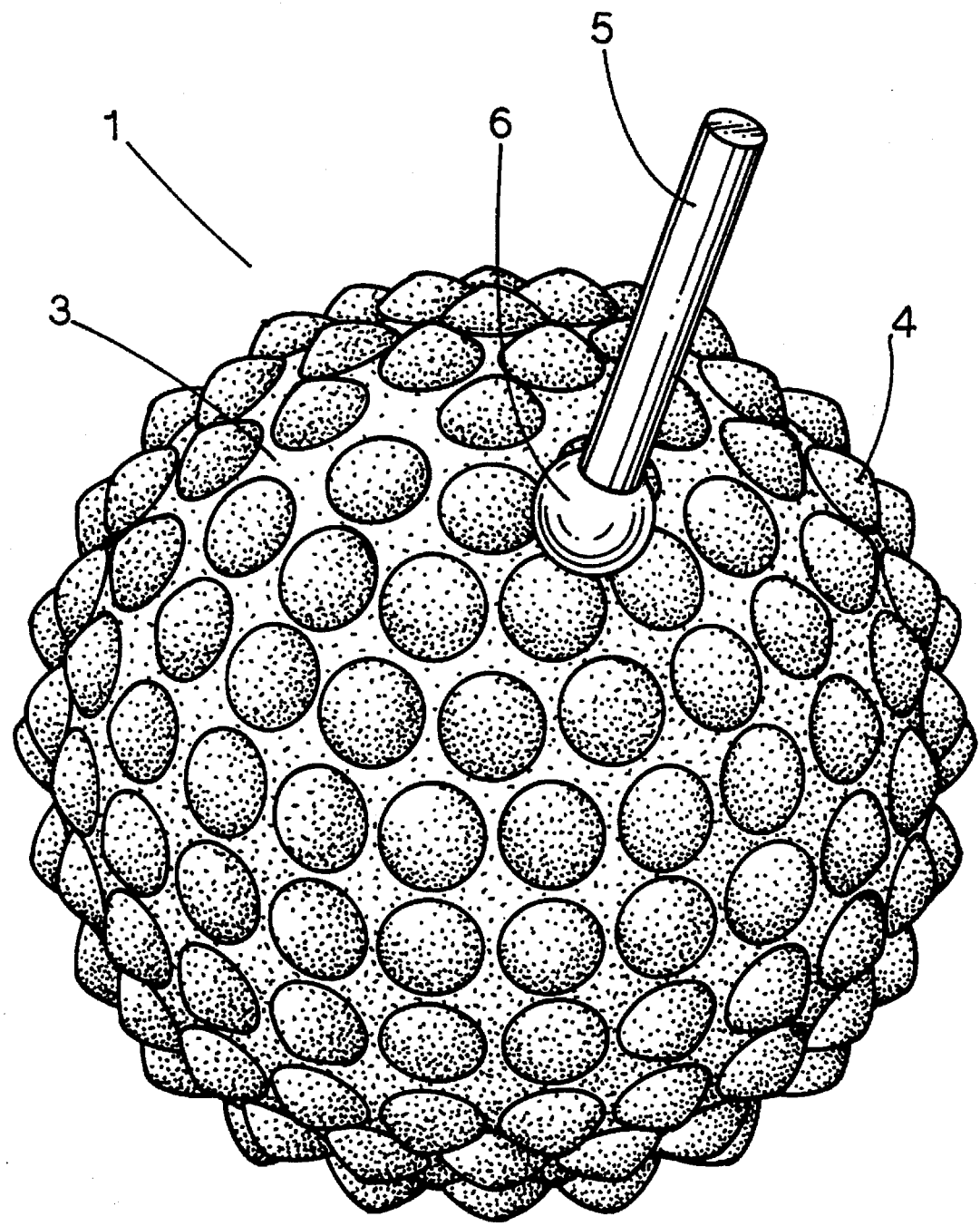
FIG. 2 is a perspective view showing a ball and pin-type actuator in simplified form.
Figure 3:
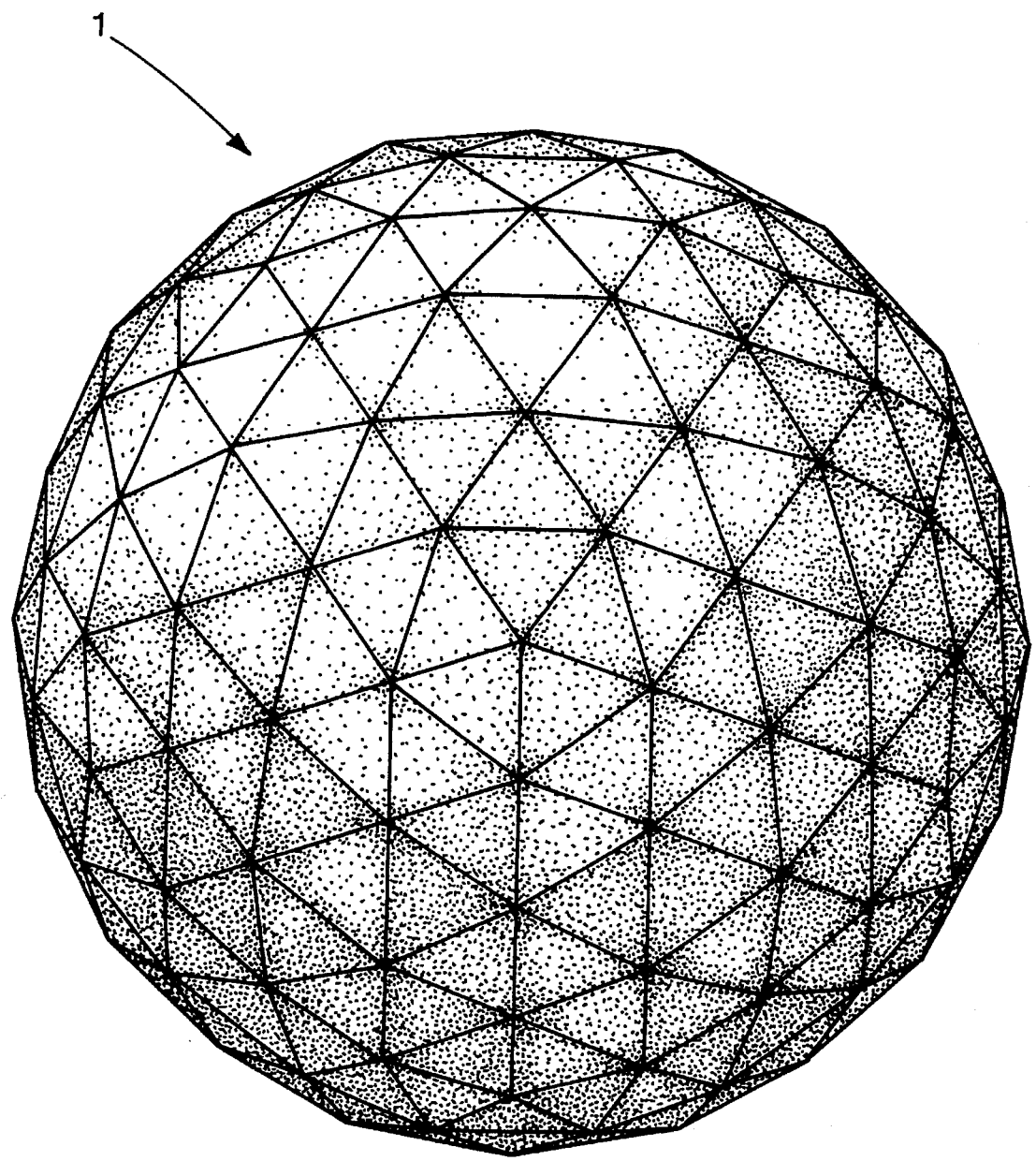
FIG. 3 is a side view of a ball having its surface divided into triangles to establish the pattern of protuberances.
Figure 4:
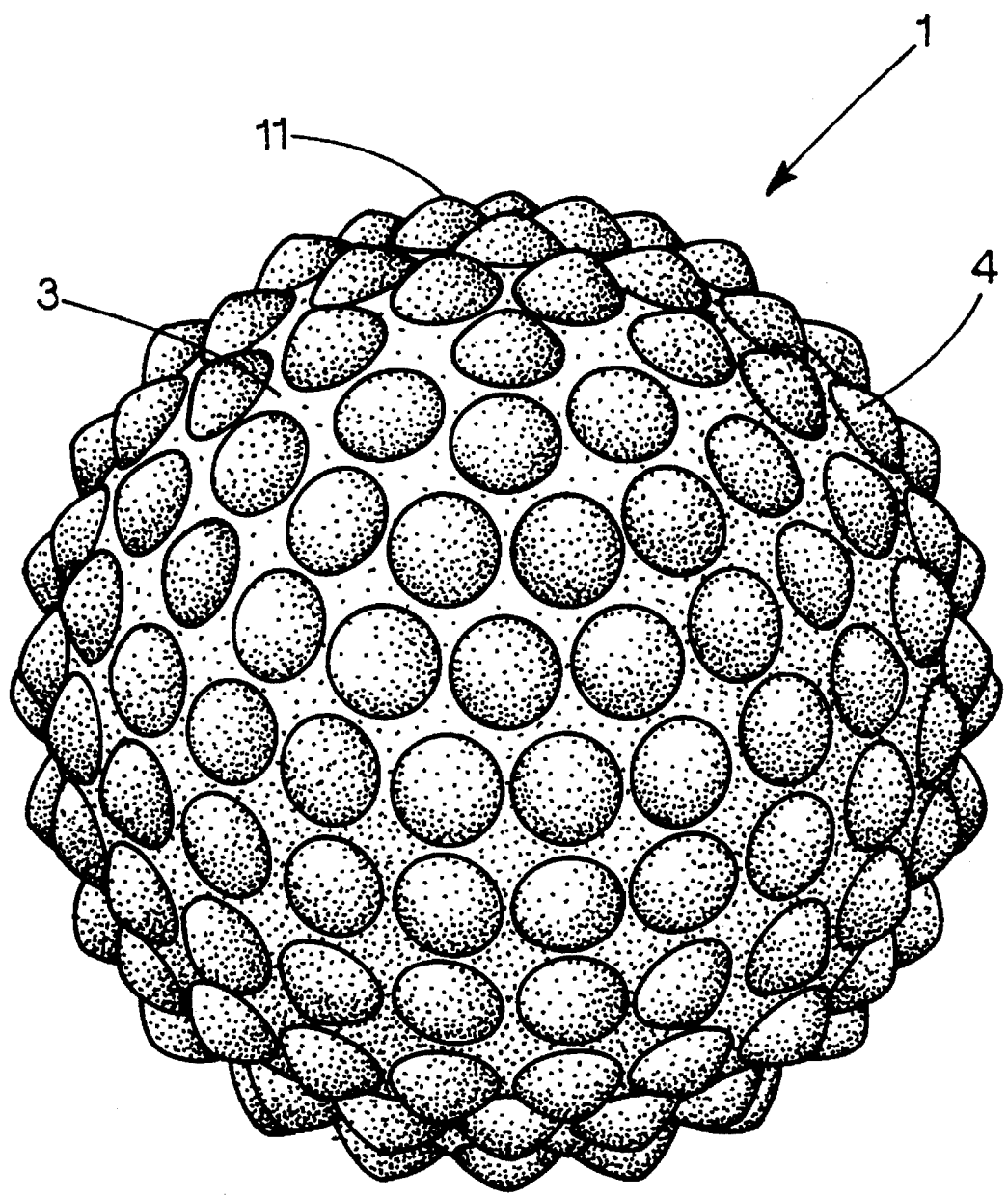
FIG. 4 is a side view of the ball of FIG. 3, with protuberances positioned at the apices of the triangles of FIG. 3.

With reference to FIG. 1, the lock-up assembly comprises a spherical member or ball 1 connected with a shank 2. The surface 3 of the ball 1 is formed with areas of triangular patterns a and square patterns b of protuberances 4. The spacing, area and size of the triangular patterns a is consistent and the same is true of the square patterns b. The size and spacing of each protuberance 4 in each pattern is also consistent.

The lock up assembly 1 further comprises an actuator 5 having a rounded or spherical tip 6. The tip 6 can be advanced or retracted, for example by a screw bolt, to penetrate or withdraw from the concavity 7 defined by a pattern of protuberances 4.

The protuberances 4 are the heads of pins 8 received and retained in radial bores 9 formed in the ball 1.

The protuberances 4 of a pattern are spaced and dimensioned and the tip 6 of the actuator is dimensioned so that the tip may penetrate the concavity 7 of the pattern and simultaneously contact all of the protuberances of the pattern, but remains spaced from the surface 3 of the ball 1.

Figure 5:
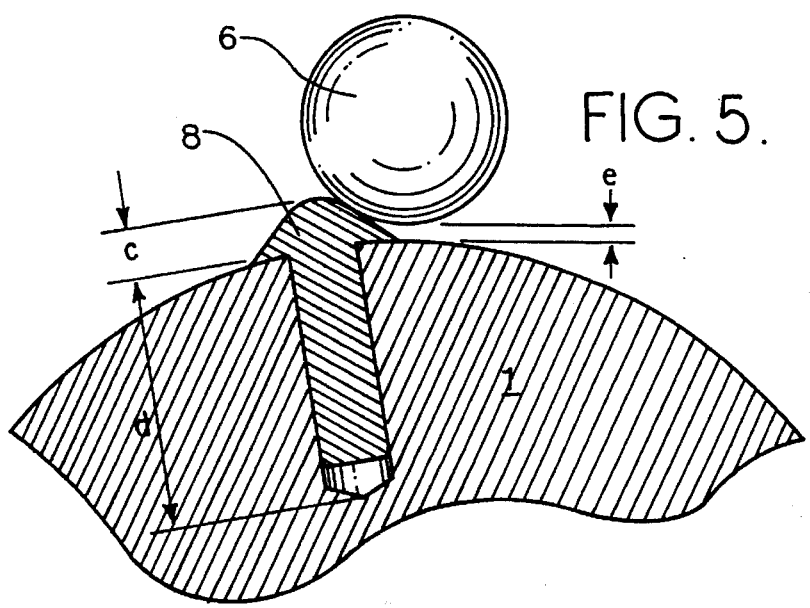
FIG. 5 is a schematic side view showing a pin having its shank positioned in a radial bore formed in the ball with its protruding head in contact with a spherical actuator end in accordance with maximum pin separation design—the dimensions are set forth in Table I.
Figure 6:
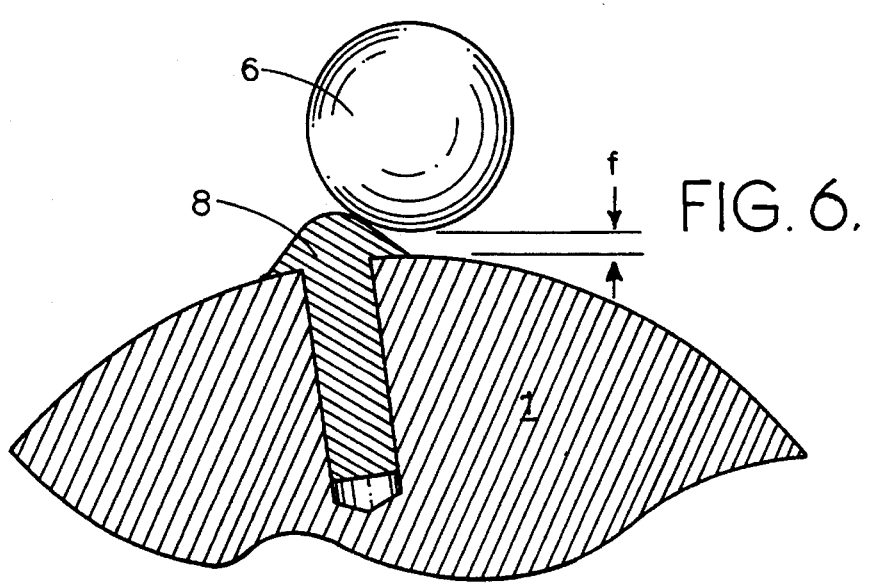
FIG. 6 is a schematic side view similar to FIG. 5, showing the components in minimum pin separation design—the dimensions are set forth in Table I.
Figure 7:
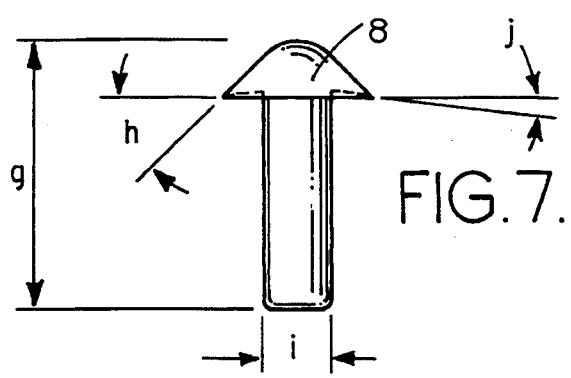
FIG. 7 is a side view of the pin of FIGS. 5 and 6, with dimensions identified thereon and set forth in Table I.
Figure 8:
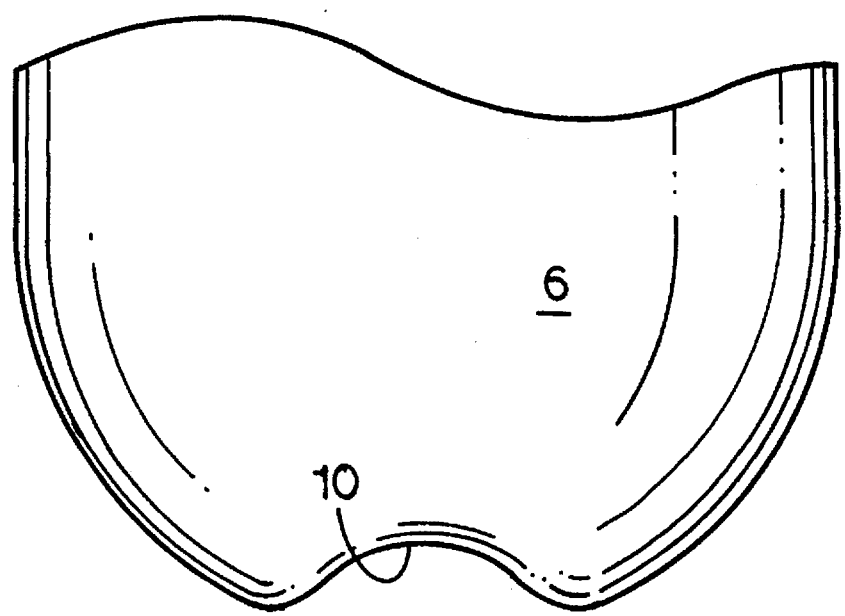
FIG. 8 is a side view of the rounded tip of the actuator having a central indentation in its end.

A suitable set of dimensions for the components of FIGS. 5–7 is provided in Table I, for recommended maximum and minimum pin separation for an overall pattern of 162 pins.

TABLE I

| Ball φ: | 1.043" |
| pin φ: | 0.142" |
| actuator tip φ: | 0.250" |
| Dimensions: | |
| c = 0.043 | g = 0.236 |
| d = 0.23 | h = 43° |
| e = 0.015 | i = 0.063 |
| f = 0.023 | j – 6.0° |

In an optional feature of the invention, the spherical tip 6 of the actuator 5 is formed to provide an indentation 10 in its end. The indentation 10 is configured to closely conform to the peak 11 of each protuberance 4. Thus if the tip 6 contacts a peak 11 straight on, the two parts will lock up.

The embodiments of the invention in which an exclusive property or privilege is claimed are defined as follows:

1. In an angularly adjustable, releasably lockable joint mechanism for rigidly joining first and second parts at a selected orientation, said mechanism comprising a rounded member having a plurality of concavities on its surface and being secured to the first part, a disengageable actuator having a rounded tip and being operative to advance the tip to lock up with the rounded member by penetrating a concavity or to retract the tip to disengage it from the rounded member, said actuator being connected with the second part, and means for holding the parts, rounded member and actuator together, said means being operative to allow the parts to change relative orientation when the actuator head is retracted, the improvement comprising:

the rounded member having a plurality of patterns of spaced-apart protuberances covering at least part of its surface, the protuberances of each pattern forming a concavity therebetween;

the patterns and protuberances being consistent in shape, area and size, the patterns having a regular polygonal configuration;

the protuberances, actuator tip and patterns being dimensioned relative to each other so that the tip can penetrate the concavity of each pattern and simultaneously contact all of the protuberances of the pattern that it penetrates, with the contact between said actuator and protuberances being located so that said actuator remains spaced from the surface of the rounded member at full penetration, whereby the tip and pattern of protuberances lock together without said tip contacting the surface of said rounded member.

2. The improvement as set forth in claim 1 wherein the rounded member is spherical.

3. The improvement as set forth in claim 1 wherein the regular polygonal configuration is triangular or square.

4. In an angularly adjustable, releasably lockable joint mechanism for rigidly joining first and second parts at a selected orientation, said mechanism comprising a rounded member having a plurality of concavities on its surface and being secured to the first part, a disengageable actuator having a rounded tip and being operative to advance the tip to lock up with the rounded member by penetrating a concavity or to retract the tip to disengage it from the rounded member, said actuator being connected with the second part, and means for holding the parts, rounded member and actuator together, said means being operative to allow the parts to change relative orientation when the actuator head is retracted, the improvement comprising:

the rounded member having a plurality of patterns of spaced-apart protuberances covering at least part of its surface, the protuberances of each pattern forming a concavity;

the patterns and protuberances being consistent in shape, area and size, the patterns having a regular polygonal configuration;

the protuberances, actuator tip and pattern being dimensioned so that the tip can penetrate the concavity of each pattern and simultaneously contact all of the protuberances of the pattern that it penetrates but remains spaced from the surface of the rounded member at full penetration, whereby the tip and pattern of protuberances lock together; and the rounded tip of the actuator having a centrally positioned indentation at its end, the indentation being configured and dimensioned to substantially match the peak of a protuberance so that the tip and protuberance may lock together.

5. A lockable joint mechanism comprising:

a ball mounted on a first part and having an outer surface;

a plurality of spaced-apart protuberances on said outer surface, each protuberance having an outer surface;

an actuator mounted on a second part and having a forward tip and a sidewall and an outer dimension of said sidewall;

said protuberances being spaced apart from each other to define concavities between adjacent protuberances, with the spacing between adjacent protuberances being less than the outer dimension of said sidewall so that said actuator engages said protuberances when said forward tip is spaced from the outer surface of said ball whereby said actuator is locked to said ball with said tip spaced from the outer surface of said ball.

6. The lockable joint mechanism defined in claim 5 wherein adjacent protuberances define regular polygonal shapes.

7. The lockable joint mechanism defined in claim 6 including a plurality of different polygonal forms.

8. The lockable joint mechanism defined in claim 7 wherein, in a locking condition, said actuator engages all protuberances adjacent thereto.

9. The lockable joint mechanism defined in claim 5 wherein said forward tip is concave and is shaped to snugly engage the outer surface of a protuberance.

10. The lockable joint mechanism defined in claim 5 further including a bore in said ball associated with each protuberance and a body connected to each protuberance and located in an associated bore.

11. The lockable joint mechanism defined in claim 5 wherein said ball is spherical.

12. The lockable joint defined in claim 5 wherein said protuberances engage the sidewall of said actuator at locations that are spaced apart from each other on said sidewall.

* * * * *